Nov. 10, 1953　　G. E. LUPPOLD, JR., ET AL　　2,658,516
FLUID RELAY MECHANISM
Filed April 20, 1948　　3 Sheets-Sheet 1

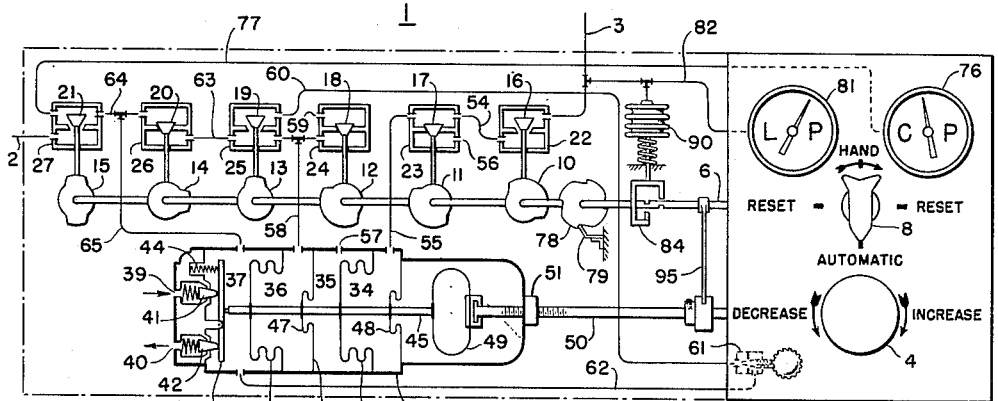

FIG. 1

| SELECTOR SWITCH POSITION | SHUT-OFF VALVE POSITION | | | | | |
|---|---|---|---|---|---|---|
| | NO. 16 | NO. 17 | NO. 18 | NO. 19 | NO. 20 | NO. 21 |
| HAND | CLOSED | OPEN | OPEN | CLOSED | CLOSED | OPEN |
| RESET | OPEN | CLOSED | CLOSED | CLOSED | OPEN | CLOSED |
| AUTOMATIC | OPEN | CLOSED | CLOSED | OPEN | CLOSED | OPEN |
| RESET | CLOSED | OPEN | OPEN | CLOSED | CLOSED | CLOSED |

FIG. 2

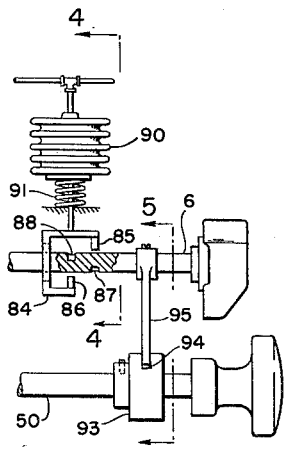

FIG. 3

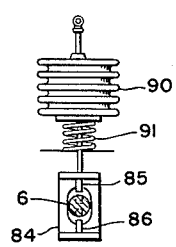

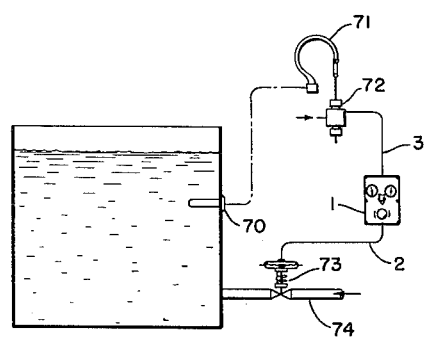

FIG. 6

*INVENTORS*
GEORGE E. LUPPOLD JR.
AND JACK F. SHANNON
BY
Raymond W. Jenkins
ATTORNEY Nov. 10, 1953 G. E. LUPPOLD, JR., ET AL 2,658,516
FLUID RELAY MECHANISM
Filed April 20, 1948 3 Sheets-Sheet 2
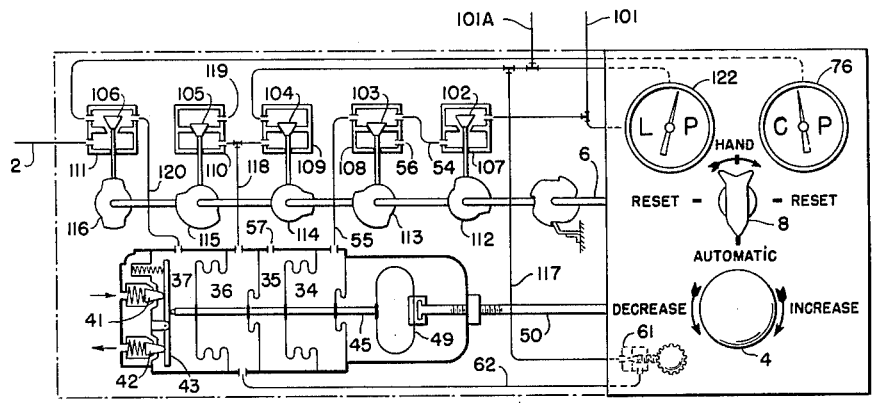
FIG. 7
| SELECTOR SWITCH POSITION | SHUT-OFF VALVE POSITION | | | | |
|---|---|---|---|---|---|
| | NO. 102 | NO. 103 | NO. 104 | NO. 105 | NO. 106 |
| HAND | CLOSED | OPEN | CLOSED | OPEN | OPEN |
| RESET | OPEN | CLOSED | OPEN | CLOSED | CLOSED |
| AUTOMATIC | OPEN | CLOSED | CLOSED | CLOSED | OPEN |
| RESET | CLOSED | OPEN | CLOSED | OPEN | CLOSED |
FIG. 8
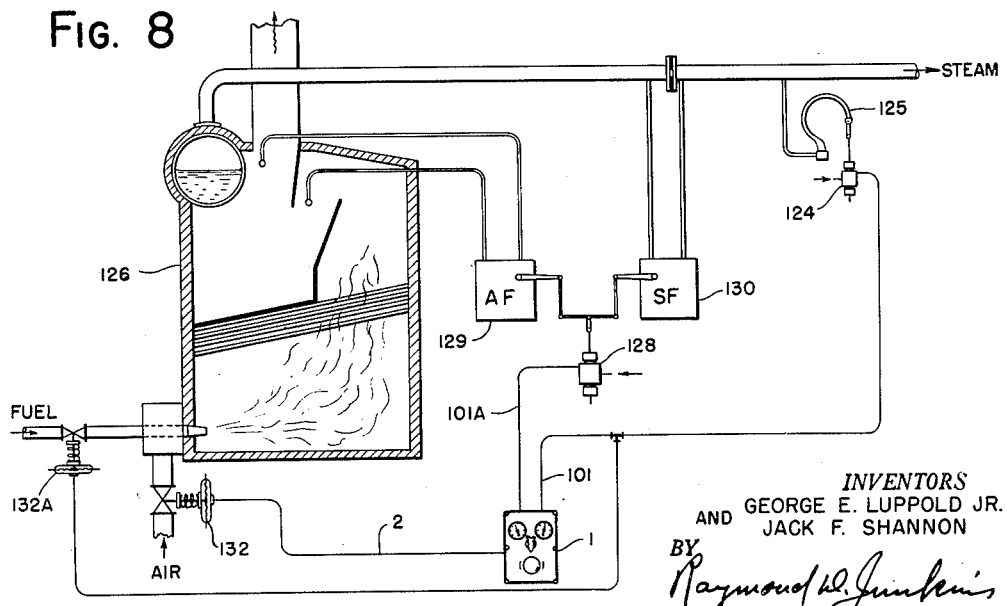
FIG. 9
*INVENTORS*
GEORGE E. LUPPOLD JR.
AND JACK F. SHANNON
BY
*ATTORNEY*

Nov. 10, 1953   G. E. LUPPOLD, JR., ET AL   2,658,516
FLUID RELAY MECHANISM
Filed April 20, 1948   3 Sheets-Sheet 3

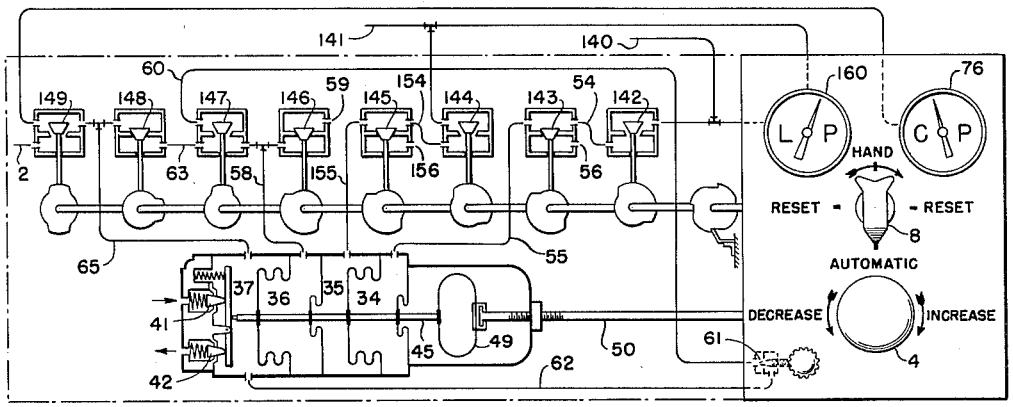

FIG. 10

| SELECTOR SWITCH POSITION | SHUT-OFF VALVE POSITION | | | | | | | |
|---|---|---|---|---|---|---|---|---|
| | NO. 142 | NO. 143 | NO. 144 | NO. 145 | NO. 146 | NO. 147 | NO. 148 | NO. 149 |
| HAND | CLOSED | OPEN | CLOSED | OPEN | OPEN | CLOSED | CLOSED | OPEN |
| RESET | OPEN | CLOSED | OPEN | CLOSED | CLOSED | CLOSED | OPEN | CLOSED |
| AUTOMATIC | OPEN | CLOSED | OPEN | CLOSED | CLOSED | OPEN | CLOSED | OPEN |
| RESET | CLOSED | OPEN | CLOSED | OPEN | OPEN | CLOSED | CLOSED | CLOSED |

FIG. 11

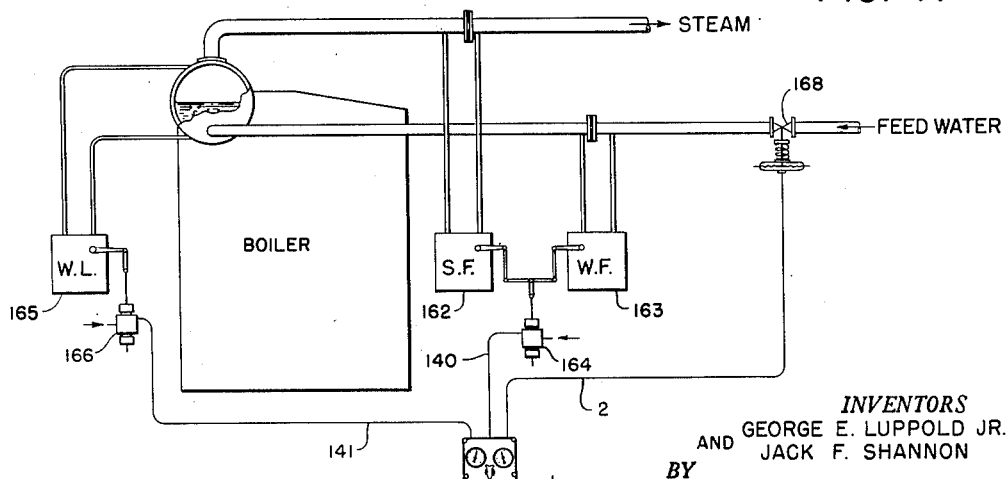

INVENTORS
GEORGE E. LUPPOLD JR.
AND   JACK F. SHANNON
BY
Raymond D. Junkins
ATTORNEY

FIG. 12

Patented Nov. 10, 1953

2,658,516

UNITED STATES PATENT OFFICE 2,658,516

FLUID RELAY MECHANISM

George E. Luppold, Jr., Los Angeles, Calif., and Jack F. Shannon, Euclid, Ohio, assignors to Bailey Meter Company, a corporation of Delaware Application April 20, 1948, Serial No. 22,174

8 Claims. (Cl. 137—86)

This invention relates to relay mechanisms for establishing control pressures, and more particularly to relay mechanisms that are adjustable either to operate automatically for establishing a control pressure varying in response to changes in a loading pressure or to establish a control pressure varying in response to the positioning of a manually adjustable member.

Where a certain condition is controlled by the operation of some mechanism, it is often desired that means be provided for effecting operation of the mechanism in response to changes in the condition. At other times it may be desired to control the operation of the mechanism manually so as to obtain some particular variation in the condition. For instance, it may be desired that the operation of a heater be controlled so as either to maintain the temperature therein at a predetermined value or to cause the temperature to vary in a particular manner. In another case it may be desired to control the supply of an element of combustion to a steam generating plant either automatically in response to changes in a plurality of variable conditions or manually so as to obtain particular changes in the conditions. Again, it may be desired to regulate the supply of feed water to a steam generating plant either automatically in response to some function of variable conditions obtained or manually to produce some desirable variation in the conditions. In either case, an adjustable mechanism may be provided to operate either automatically or manually to provide the desired control.

An object of our invention is to provide an improved relay mechanism. Another object is to provide an improved mechanism that is adjustable to operate either automatically for producing a control pressure varying in response to changes in a loading pressure or manually for producing any desired control pressure. Still another object is to provide a mechanism that is adjustable to operate either manually to produce any desired control pressure or automatically to produce a control pressure varying in response to changes in some function of a plurality of variables. Yet another object is to provide an improved mechanism that is adjustable to operate either automatically or manually to determine a control pressure and having means for preventing adjustment from one type of control to the other until conditions are suitable for making the change. Other objects will appear in the course of the following description.

In the accompanying drawings there are shown for purposes of illustration several forms which our invention may assume in practice.

In these drawings:

Fig. 1 is a schematic diagram of one form of our improved relay mechanism.

Fig. 2 is a table of valve positions for various types of operation of our improved mechanism.

Fig. 3 is an enlarged view of a portion of the mechanism shown in Fig. 1.

Fig. 4 is a view taken on the plane of the line 4—4 of Fig. 3.

Fig. 5 is a view taken on the plane of the line 5—5 of Fig. 3.

Fig. 6 is a schematic diagram of a system including our improved relay mechanism.

Fig. 7 is a schematic diagram of another form of our improved relay mechanism.

Fig. 8 is a table of valve positions for different types of operation of the mechanisms shown in Fig. 7.

Fig. 9 is a schematic diagram of a system including the mechanism of Fig. 7.

Fig. 10 is a schematic diagram of still another form of our invention.

Fig. 11 is a table of valve positions which provide for different types of operation of the mechanism shown in Fig. 10.

Fig. 12 is a schematic diagram of a system including the mechanism of Fig. 10.

Referring to the drawings, and more particularly to Fig. 1, it will be noted that there is shown a mechanism, generally designated 1, which is operative to supply a control pressure to a conduit 2 varying continuously in value upon the change of a loading pressure in a conduit 3 from a desired value, or varying directly with changes in the adjustment of a manually operable knob 4. The mechanism 1 includes a cam shaft 6 journaled in a mounting plate 7 which is adapted to be fastened to a panel or other suitable mounting means, and attached to the cam shaft at the face of the mounting plate is a manually operable knob 8 cooperating with legends inscribed on the plate to indicate the status of the control system for different positions of the knob. Fixed to the cam shaft are cams 10, 11, 12, 13, 14 and 15 for positioning valves 16, 17, 18, 19, 20 and 21 in valve casings 22, 23, 24, 25, 26 and 27, respectively, to control communication between opposite ends of the casings.

Attached to the mounting plate by suitable means, not shown, is a relay device including a casing 30 which is divided between its ends by a fixed partition 31. At opposite sides of the partition are bellows 32 and 33 cooperating with the casing and the partition to form chambers 34, 35, 36 and 37. Opening through one end of the casing into the chamber 37 are fluid supply and exhaust ports 39 and 40, respectively. Spring pressed valves 41 and 42 are normally held in positions for closing the fluid supply and exhaust ports, and a pivoted beam 43 is urged by a spring 44 in a direction to unseat the exhaust valve, while an elongated member 45 is adapted to be moved against the beam for moving the latter in a direction to unseat the supply valve 41. The member 45 extends longitudinally through the casing and is connected to the bellows 32, 33 and to flexible sealing elements 47 and 48 supported by the partition 31 an the outer end wall of the chamber 34. The member 45 is connected to one side of a bowed spring 49, and the other side of the spring is connected to a rod 50 threaded through a boss portion 51 of the casing and connected to the knob 4 for rotation therewith.

The loading pressure in the conduit 3 is supplied to one end of the valve casing 22, and the other end of this valve casing is connected by a conduit 54 to one end of the valve casing 23. The end of the valve casing 23 receiving fluid from the conduit 54 is also connected by a conduit 55 to the chamber 34, and the opposite end of the valve casing 23 is connected to atmosphere by a port 56. When the valve 16 is open and the valve 17 is closed, the loading pressure is supplied from the conduit 3 through the valve casing 22, the conduit 54, the valve casing 23 and the conduit 55 to the chamber 34. With the valve 16 closed and the valve 17 open, the flow of pressure fluid from the conduit 3 is cut off and the chamber 34 is vented through the conduit 55, the valve casing 23 and the port 56.

The chamber 35 is connected to atmosphere continuously through a port 57, and the chamber 36 is connected by a conduit 58 to one end of each of the valve casings 24 and 25. The other end of the valve casing 24 is vented to atmosphere by a port 59, and the other end of the valve casing 25 is connected by a conduit 60, an adjustable flow restricting valve 61, and a conduit 62 to the chamber 37. The end of the valve casing 25 communicating with the conduit 58 is also connected by a conduit 63 with one end of the valve casing 26, and the other end of the casing 26 is connected by conduits 64 and 65 to one end of the valve casing 27 and to the chamber 37. The other end of the casing 27 is connected to the conduit 2.

When it is desired that the mechanism operate automatically to determine control pressure in the conduit 2, the cam shaft 6 is rotated to the position shown in Fig. 1. The valve 16 is then open and the valve 17 is closed so that the loading pressure passes through the valve casings 22, 23 and the conduits 54, 55 to the chamber 34. The valve 18 is closed and the valve 19 is open so as to connect the chamber 36 through the conduits 58, 60, the flow restricting valve 61, and the conduit 62 to the chamber 37. The valve 20 is closed and the valve 21 is open so that the pressure in the chamber 37 is supplied to the conduit 2. The loading pressure acting in the chamber 34 against the bellows 32 tends to move the member 45 to the left for swinging the beam 43 about its pivot and unseating the fluid supply valve 41. The tension of the spring 49 is adjusted, however, to balance the pressure on the bellows 32 as long as the control pressure remains at some desired value. As soon as the loading pressure exceeds the desired value, the valve 41 is opened to admit pressure fluid to the chamber 37 until the pressure acting on the left-hand side of the bellows 33 increases sufficiently to balance the increase in loading pressure. The increase in pressure in the chamber 37 results, however, in a flow of fluid from this chamber through the conduit 62, past the restricting valve 61, through the conduit 60, the valve casing 25 and the conduit 58 to the chamber 36. The pressure increase in chamber 36 aids the loading pressure in actuating the member 45, and a further pressure increase in chamber 37 is required to balance the pressures in chambers 34 and 36.

Since the pressure in chamber 36 continues to build up at a rate determined by the adjustment of the valve 61, the pressure in chamber 37 must also continue to increase as long as the loading pressure remains above the desired value. As soon as the loading pressure returns to the desired value, its action on the member 45 is counteracted by the spring 49, and the pressures in the chambers 36 and 37 are permitted to balance each other. The beam 43 then assumes a neutral position so that the valves 41 and 42 are both closed to hold the pressure in the chamber 37 at the value attained. It will be noted that this pressure is supplied through the conduit 65 and the valve casing 27 to the conduit 2 for delivery to some control means. If the control pressure in conduit 3 drops below the desired value, the forces on the member 45 are then unbalanced so as to move it away from the beam 43 and permit the latter to be moved by the spring 44 for unseating the exhaust valve 42. The pressure in the chamber 37 is then reduced in an attempt to counteract the unbalance, but fluid flows from the chamber 36 through the conduits 58, 60, the restricting valve 61, and the conduit 62 to the chamber 37 so as to maintain the unbalance and effect an opening of the exhaust valve for reducing the control pressure as long as the loading pressure is low.

Our relay mechanism has been shown in Fig. 6 connected in a system for controlling the supply of a heating agent to a heater in response to changes in temperature therein. An element 70 is subjected to the heater temperature and produces a force which operates a Bourdon tube 71 to position a pilot valve 72 controlling the supply of pressure fluid from a source to the conduit 3. The pressure in the conduit 3 is maintained at a predetermined value as long as the temperature remains at the value desired. The relay mechanism 1 is adjusted to balance at this pressure and to supply fluid at a constant pressure through the conduit 2 to a pressure actuated valve mechanism 73 in a heating agent supply line 74. An increase in the temperature above the desired value results in an operation of the relay mechanism 1 to increase the pressure supplied to the valve 73 for moving the latter in a closing direction as long as the temperature remains high. A drop in the temperature below the desired value results in a continuous opening of the valve 73 until the temperature is returned to the desired value. It will be understood that the relay is not limited to use in the temperature control system of Fig. 6, but may be made responsive to changes in other conditions, such as liquid level, rate of fluid flow, etc., for regulating apparatus to maintain them at desired values.

At times it may become desirable that the control pressure in conduit 2 be regulated manually so that the resulting condition may be varied in some particular manner. If the relay mechanism is operating automatically at the time it is decided to switch to manual control, then adjustments should be made so that the pressure delivered to the conduit 2 immediately after making the switch will be the same as it was at the time the relay was taken off from automatic control. Any sudden change in the control pressure resulting in a switching from one type of control to another may cause the system to be upset. In order that the operator may know the value of the control pressure, a meter 76 is mounted on the plate 7 and is connected by a conduit 77 to the upper end of the valve casing 27. Between the automatic and hand control positions of the cam shaft, are two reset positions, as indicated. Fixed to the cam shaft is a toothed wheel 78 engaged by a pawl 79 so that the cam shaft may be rotated only in a clockwise direction, as indicated by the arrow on the plate 7. When the knob 8 is rotated from the automatic to the first reset position, the valve 21 is closed to prevent any change taking place in the pressure in conduit 2. The valve 16 is closed to cut off the supply of loading pressure, and the valve 17 is opened to vent the chamber 34 to atmosphere through the conduit 55 and the port 56. The valve 18 is opened to vent the chamber 36 through the conduit 58 and the port 59, and the valves 19 and 20 are closed to cut off communication between the chambers 36 and 37. With the chambers 34, 35 and 36 connected to atmosphere, the position of the member 45 is determined by the pressure existing in the chamber 37 and the action of the spring 49.

Under automatic operation, the spring was put under tension to balance the pressure in the chamber 34. On going to hand operation, it is necessary that the spring be put under compression to balance the pressure in the chamber 37. It will be noted that the pressure in the chamber 37 is indicated on the meter 76 during reset by reason of the connections from the chamber through the conduit 65, the upper portion of the valve casing 27 and the conduit 77 to the meter. The knob 4 is rotated in a clockwise direction to compress the spring 49 and effect an increase in the pressure in the chamber 37 until the meter 76 indicates that it is equal to the value that existed when taken off from automatic control. When this condition exists, the knob 8 may be rotated to the hand position for opening the valve 21 and supplying pressure to the conduit 2. The other valves remain in the same positions as they did at reset. The knob 4 may then be rotated to vary the control pressure as desired.

If it is desired to return to automatic control, it is necessary first that the control pressure in the conduit 3 be returned to a value equal to that existing when the condition controlled is at the desired value. The reason why this is necessary will be pointed out later. Just before taking the relay mechanism off manual control, the knob 4 is adjusted so that the control pressure in line 2 adjusts valve 73 to allow the condition to return to the condition to be maintained, thus the pressure in the conduit 3, as indicated by a meter 81, connected to the conduit 3 through a conduit 82, is at the value obtained when the condition controlled is at the value to be maintained. To prevent a rotation of the cam shaft from the hand position before the loading pressure has been returned to this value, there is provided a frame 84 having fingers 85, 86 receivable in recesses 87, 88 in the cam shaft when it is in position for hand control. A bellows 90 is connected to the frame 84 and is subjected at its interior to the loading pressure in the conduit 3. A spring 91 opposes the expansion of the bellows so that the frame 84 is held in a position with its fingers free of the recesses 87, 88 when the loading pressure is at the proper value. Any change in the pressure from this value results in a locking of the cam shaft.

With the loading pressure at the value effecting an unlocking of the cam shaft, the knob 8 may be rotated from the hand position in a clockwise direction to the next reset position. When the cam shaft is in this reset position, the valve 16 is open and the valve 17 is closed so that the loading pressure is supplied again to the chamber 34. The valves 18 and 19 are closed, and the valve 20 is open so that the chambers 36, 37 are connected in free communication with each other through the conduit 58, the valve casing 25, the conduit 63, the valve casing 26, and the conduit 65. The valve 21 is closed to prevent any change taking place in the pressure in the conduit 2. The pressures in the chambers 36 and 37 are then equal by reason of the free communication between them, and any unbalanced force on the member 45 is due to differences between the action of the pressure in the chamber 34 and the action of the spring 49. The knob 4 is then rotated to place the spring 49 under a tension which balances the pressure in the chamber 34. The pressure in the chamber 37, as indicated by the meter 76, will probably have increased during this time to a value much higher than that supplied to the conduit 2 when the hand control was discontinued. By rotating the knob 4 to increase the tension of the spring 49 until it overcomes the force exerted by the pressure in the chamber 34, the member 45 is moved to the right to permit an opening of the valve 42 for venting pressure from the chamber 37. If the pressure in the chamber 37 drops too low, it is only necessary to turn the knob and decrease the spring tension until it is less than the force resulting from the pressure in the chamber 34. As soon as the pressure in the chamber 37 is equal to the pressure in the conduit 2, and the tension of the spring 49 has been adjusted to balance the pressure in the chamber 34, then the knob 8 may be rotated to the automatic control position.

To prevent rotation of the knob 8 from the reset position to the automatic position before the spring 49 has been adjusted by the knob 4 to exert the proper tension, and to prevent a changing of the spring tension by rotation of the knob 4 while under automatic control, there is provided a collar 93 adjustably fixed to the rod 50 and having a groove 94 in its periphery adapted to receive a plate member 95 fixed to the cam shaft 6. The collar may be adjusted on the shaft 50 so that its groove 94 receives the plate 95 when the spring tension balances any loading pressure that is provided while the condition is maintained at the desired value. If the spring is not adjusted to this tension before going from reset to the automatic position, the edge of the plate member will engage the collar and prevent rotation of the knob 8. When the plate member is received within the groove, the bottom wall of the groove acts against the end of the plate member and prevents rotation of the shaft 50.

When the knob 8 is moved to the automatic control position, the valves again assume positions for supplying the loading pressure to the chamber 34, connecting chambers 36 and 37 through the restricting valve 61, and supplying pressure fluid from the chamber 37 to the conduit 2.

The reason for adjusting the relay mechanism manually to bring the controlled condition to the value that it is desired to maintain by automatic operation will now be explained. As pointed out above, the pressure in the conduit 3 is representative of the condition. If the temperature of the heater in Fig. 6 is below that which it is desired to maintain by automatic operation, then the pressure in the conduit 3 is correspondingly low. Assuming that there was no locking means provided and that it was possible to move the knob 8 from the hand position to the next reset position while the pressure in the conduit 3 was low, then the spring 49 would have to be adjusted to balance this low pressure when in the reset position because the chambers 36 and 37 are then connected in free communication. It will be appreciated that the relay mechanism operates automatically to maintain a constant pressure when the spring 49 balances the pressure in chamber 34. If the spring tension is made low to balance a low pressure from the conduit 3, then the mechanism operates automatically to maintain the condition which produces the low pressure in conduit 3. Without the locking means it would be possible when under automatic control to rotate the knob 4 for varying the tension of the spring 49 and causing the mechanism to maintain a different temperature. A slight change in the position of the knob 4, however, may cause a considerable change in the value of the condition maintained. If this knob was not locked during automatic operation, it may be inadvertently rotated and cause an operation of the furnace at temperatures much different from those desired. Since it is desirable that the knob 4 be locked during automatic operation, the locking must take place when the tension of the spring 49 is at the value that establishes the desired condition, and a balancing of the mechanism in the reset position can be obtained with this spring tension only when the pressure in the conduit 3 is at the value produced by the desired condition.

Fig. 7 shows a form of our relay mechanism which is either operative automatically to supply a control pressure to the conduit 2 in direct proportion to the total or average of two loading pressures supplied by conduits 101 and 101A, or is operative to supply a pressure to the conduit 2 in proportion to the adjustments of the manually operable knob 4. There are provided in this arrangement only five valves 102, 103, 104, 105 and 106 positioned within valve casings 107, 108, 109, 110 and 111 by cams 112, 113, 114, 115 and 116 fixed to the cam shaft 6. The valves 102 and 103 operate as in Fig. 1 to connect the relay chamber 34 either to the conduit 101 through the valve casing 107, the conduit 54, the valve casing 108 and the conduit 55, or to atmosphere through the conduit 55, the valve casing 108 and the port 56. The valve 104 controls the connection of the conduit 101A to the chamber 36 through a conduit 118, and a branch conduit 117 connects the conduit 101A continuously through the restricting valve 61 and the conduit 62 to the chamber 36. The valve 105 controls the connection of the chamber 36 to atmosphere through the conduit 118, the valve casing 110 and a port 119. The valve 106 controls the connection of the chamber 37 through a conduit 120 and the valve casing 111 to the conduit 2.

When the valves are in the positions shown in Fig. 7 to effect automatic operation of the relay mechanism, pressure fluid is supplied from the conduit 101 to the chamber 34, and pressure fluid is supplied from the conduit 101A through the retricting valve 61 to the chamber 36. Since the chamber 35 is vented to atmosphere through the port 57, the member 45 is balanced only when the tension of the spring 49 and the pressure in the chamber 37 exert a force on it equal to the force produced by the combined pressures in chambers 34 and 36. If either one or both of the pressures in the chambers 34 and 36 are increased, the member 45 is moved against the beam 43 to unseat the fluid supply valve 41 until the pressure in the chamber 37 increases sufficiently to rebalance the system. If the total of the pressures in the chambers 34 and 36 is decreased, the exhaust valve 42 is unseated until the pressure in the chamber 37 has decreased a corresponding amount. Since there is no connection between the chambers 36 and 37, no regenerative action will take place as in Fig. 1 to continuously increase or decrease the control pressure when the loading pressure varies from a predetermined value.

If it is desired to go to manual control, the cam shaft is first moved to a reset position for closing the valve 102 to cut off the supply of loading pressure from the conduit 101, and opening the valves 103 and 105 for venting the chambers 34 and 36. The valve 106 is closed at the same time to cut off communication between the chamber 37 and the conduit 2. The knob 4 is then rotated to place the spring 49 under compression so that it opposes the action of the pressure in the chamber 37 on the member 45. As soon as the pressure in the chamber 37, as indicated by the meter 76, equals the value of the pressure supplied to the conduit 2 when the operation under automatic control was terminated, the knob 8 may then be rotated to the hand control position for opening the valve 106. The positions of the other valves are not changed at that time. It will be appreciated that air will flow from the conduit 101A through the restricting valve 61 and the chamber 36 to atmosphere while the mechanism is being set for hand operation, but the total air escaping will be small, and the pressure in the chamber 36 will not be raised above atmospheric to effect actuation of the member 45.

In returning to automatic control, it is only necessary that the loading pressures from the conduits 101 and 101A be supplied to the chambers 34 and 36, and that the valve 106 be closed while the spring 49 is adjusted by the knob 4 to produce a pressure in the chamber 37 equal to the pressure that was supplied to the conduit 2 when hand control was terminated. The valves are moved to the positions permitting this adjustment when the knob 8 is moved from the hand position to the next reset position. In this reset position the valve 102 is open and the valve 103 is closed so that the pressure in the conduit 101 is supplied to the chamber 34. The valve 104 is open so that the pressure in the conduit 101A may flow freely to the chamber 36 and increase the pressure therein rapidly to line pressure. The valves 105 and 106 are both closed to cut off the venting of chamber 36 and the supply from chamber 37 to the conduit 2, respectively. As soon as the pressure in the chamber 37 has been made equal to the pressure that was last supplied to the conduit 2, the knob 8 may be moved to the automatic control position for opening the valve 106 and closing the valve 104. The other valves do not change position at this time. Valve 104 is closed so that the pressure in the conduit 101A gains admission to the chamber 36 only through the restricting valve 61. This is to prevent operation of the relay in response to sudden load changes when operating automatically. In order that the operator may know the total of the loading pressures applied to the relay mechanism, there is provided a meter 122 connected to the conduits 101 and 101A and having an indicator positioned proportionally to the total or average of the pressures.

In Fig. 9 we have shown a system in which the relay mechanism of Fig. 7 is adapted for use. In this case, the control pressure in the conduit 101 is obtained from a pilot valve 124 which is operated by a Bourdon tube 125 in response to pressures in a steam line leading from a steam generator 126. The conduit 101A is connected to a pilot valve 128 which is positioned by devices 129 and 130 operating respectively in response to air flow through the generator and steam flow through the steam line. The control pressure is delivered from the relay mechanism 1 through the conduit 2 to a pressure responsive valve 132 controlling the supply of air for combustion to the steam generator. Steam pressure directly controls valve 132A for the fuel supply.

In Fig. 10 there is shown a relay mechanism similar to that of Fig. 1, but operating either automatically to regulate a control pressure supplied to a conduit 2 in response to changes in the differential of pressures supplied by conduits 140 and 141, or manually to regulate the control pressure as desired. To control the flow of fluid relative to the chambers 34, 35, 36 and 37 of the relay, there are provided valves 142, 143, 144, 145, 146, 147, 148 and 149 which are adapted to be moved to open and closed positions, as indicated in Fig. 11, by cams connected to the cam shaft 6. The valves 142 and 143 are arranged to connect the chamber 34 either to the pressure supply conduit 140 through the conduit 55, the casing for the valve 143, the conduit 54, and the casing for the valve 142, or to atmosphere through the conduit 55 and past the valve 143 to the port 56. In a similar manner the chamber 35 is connected by the valves 144 and 145 either to the pressure supply conduit 141 through the conduits 155, 154 and the casing for the valve 144, or to atmosphere through the conduit 155 and past the valve 145 to the port 156. The chambers 36 and 37 are controlled by the valves 146, 147, 148 and 149 in the same manner as they are controlled by the valves 18, 19, 20 and 21 in Fig. 1. The chamber 36 may be connected to atmosphere through the conduit 58 and past the valve 146 to the port 59, or it may be connected restrictively to the chamber 37 through the conduit 58, past the valve 147, through conduit 60, the restricting valve 61 and the conduit 62, or it may be connected in free communication with the chamber 37 through the conduit 58, the casing for the valve 147, the conduit 63, past the valve 148 and through the conduit 65. The communication between the chamber 37 and the conduit 2 is controlled by the valve 149.

The only difference between the mechanism of Fig. 10 and that of Fig. 1 is in the provision of the valves 144 and 145 for connecting the chamber 35 either to the pressure supply conduit 141 or to atmosphere. For automatic operation, the valves are positioned as shown in Fig. 10 to connect the chambers 34 and 35 to the conduits 140 and 141, respectively, to connect the chamber 36 in communication with the chamber 37 past the restricting valve 61, and to connect the chamber 37 to the conduit 2. The spring 49 is adjusted to balance a predetermined differential in pressure between the chambers 34 and 35. On a variation of the pressure differential from this value, the relay valves 41 and 42 are actuated to produce a continuing increase or decrease in the pressure supplied to the conduit 2. Before going to hand control, the cam shaft is moved to a reset position for positioning the valves to vent the chambers 34, 35 and 36, and to cut off communication between the chamber 37 and the conduit 2. The spring 49 is then adjusted until the pressure in the chamber 37, as indicated by the meter 76, is equal to the pressure supplied to the conduit 2 when the automatic control was terminated. The cam shaft may then be rotated to the hand control position for opening the valve 149 so as to supply the pressure from the chamber 37 to the conduit 2. In returning to automatic control, the cam shaft is first moved to a reset position for connecting the chambers 34 and 35 to the conduits 140 and 141, connecting the chambers 36 and 37 in free communication past the valve 148, and cutting off communication between the chamber 37 and the conduit 2. The spring 49 is then adjusted until the pressure in the chamber 37 is the same as it was when hand control was terminated, and the tension of the spring is balanced by the differential in pressure between conduits 140 and 141. When these conditions exist, the cam shaft may be moved to the automatic control position for placing the chambers 36 and 37 in restrictive communication past the valve 61, and connecting the chamber 37 to the conduit 2. In order that the operator may know the differential pressures between the conduits 140 and 141, there is provided a differential meter 160 connected to these conduits as shown. There may be provided, if desired, a locking means similar to that employed with the relay of Fig. 1. In this case, however, the locking means for the cam shaft will be made responsive to the differentials between the control pressures in the conduits 140 and 141. The cam shaft will be locked in its hand control position until the differential between the control pressures is at the desired value for automatic operation.

Fig. 12 shows a system in which our relay mechanism of Fig. 10 is adapted for use. In this case, the rates of steam flow and water flow relative to a boiler are measured by devices 162 and 163 which position a pilot valve 164 controlling the supply of pressure to the conduit 140. A device 165 operates in response to changes in the water level of the boiler to control a pilot valve 166 supplying pressure to the conduit 141. The relay mechanism operates either automatically or manually, as described, to control the pressure in the conduit 2 leading to a pressure responsive valve 168 connected in the feed water line to the boiler.

Our relay mechanism has been shown and described in different forms to provide automatic control in response to variations in a single pressure, variations in the totals of two pressures, and variations in the differences between two pressures. There have also been shown systems in which the mechanism in each of its forms is adapted for use. It will be appreciated that the mechanism may be modified to provide a control in response to changes in the totals or differences of more than two pressures, or it may be arranged to provide a control in response to changes in some combination of pressure differences and totals, if desired. The forms of our invention and

What we claim as new and desire to secure by Letters Patent of the United States, is:

1. A relay mechanism comprising, in combination, means providing a first pressure chamber having a flexible wall, means providing second and third pressure chambers separated by a common flexible wall, means connecting said flexible walls together for simultaneous movement, fluid supply and discharge ports opening into said third chamber, valve means for controlling said fluid supply and discharge ports, means including a member yieldingly urged in one direction for effecting actuation of said valve means to close said supply port and to open said discharge port, said member arranged for actuation by said wall connecting means to open said supply port and to close said discharge port, yielding means connected to said wall connecting means and adapted to be adjusted for exerting a yielding force on said connecting means in either of opposite directions, valves for connecting said first chamber either to a pressure fluid supply or to exhaust and connecting said second chamber either in restrictive communication with said third chamber or to exhaust, valve actuating means operable in a first position to cause the valves to connect said first chamber to said fluid supply while connecting said second chamber in restrictive communication with said third chamber, and operable in a second position to cause the valves to connect said first and second chambers to exhaust, locking means for said valve actuating means, said locking means responsive to the supply pressure and operative to effect a locking of said valve actuating means when the latter is in said second position and the supply pressure varies from a predetermined value.

2. The relay mechanism of claim 1 in which said valve actuating means comprises cams fixed to a manually operable cam shaft, and said locking means comprises a member receivable in recesses in said shaft when said valve actuating means is in said second position, and means responsive to the supply pressure for positioning said member.

3. The relay mechanism of claim 1 in which said valve actuating means comprises cams fixed to a manually rotatable cam shaft, said yielding means is connected to a member adjustable longitudinally of said cam shaft, and means are connected to said cam shaft and said adjustable member for preventing rotation of said cam shaft to move the valve actuating means from said second position to said first position until said adjustable member has been moved to a predetermined position.

4. The relay mechanism of claim 1 in which said valve actuating means comprises cams fixed to a manually rotatable cam shaft, said yielding means is adjustable by a member movable longitudinally of said cam shaft, and a plate member is fixed to said cam shaft and is receivable in a slot provided by means fixed to said first member when the latter is in a predetermined position.

5. A relay mechanism comprising, in combination, means providing first and second pressure chambers separated by a common flexible wall, means providing third and fourth pressure chambers separated by a common flexible wall, means connecting said flexible walls together for simultaneous movement, fluid supply and discharge ports opening into said fourth chamber, valve means for controlling said fluid supply and discharge ports, means including a member yieldingly urged in one direction for effecting actuation of said valve means to close said supply port and to open said discharge port, said member arranged for actuation by said wall connecting means to open said supply port and to close said discharge port, yielding means connected to said wall connecting means and adapted to be adjusted for exerting a yielding force on said connecting means in either of opposite directions, means including valves for connecting said first and second chambers either to separate fluid supply sources or to exhaust and connecting said third chamber either in restricted communication with said fourth chamber or to exhaust, and a fluid discharge connection communicating with said fourth chamber.

6. The relay mechanism of claim 5 including manually operable means for actuating said valves, said manually operable means movable to one position for connecting said first and second chambers to supply sources and connecting said third and fourth chambers in restricted communication, and movable to another position for connecting said first, second and third chambers to exhaust.

7. A relay mechanism comprising, in combination, means providing first and second pressure chambers separated by a common flexible wall, means providing third and fourth pressure chambers separated by a common flexible wall, means connecting said flexible walls together for simultaneous movement, fluid supply and discharge ports opening into said fourth chamber, valve means for controlling said fluid supply and discharge ports, means including a member yieldingly urged in one direction for effecting actuation of said valve means to close said supply port and to open said discharge port, said member arranged for actuation by said wall connecting means to open said supply port and to close said discharge port, yielding means connected to said wall connecting means and adapted to be adjusted for exerting a yielding force on said connecting means in either of opposite directions, means including valves for connecting said first and second chambers either to separate fluid supply sources or to exhaust, connecting said third chamber either in restrictive communication with said fourth chamber, in free communication with said fourth chamber, or to exhaust, and controlling the connection of said fourth chamber with a discharge connection, and manually operable means movable to one position for actuating the valves for connecting said first and second chambers to the supply sources, connecting said third and fourth chambers in restrictive communication, and connecting said fourth chamber with said discharge connection; said manually operable means movable to a second position for actuating the valves for connecting said first, second and third chambers to exhaust and cutting off communication between said fourth chamber and said discharge connection; movable to a third position for actuating the valve for connecting said first, second and third chambers to exhaust and connecting said fourth chamber to said discharge connection, and movable to a fourth position for actuating the valves for connecting said first and second chambers to the supply sources, connecting said third and fourth chambers in free communication, and cutting off communication between said fourth chamber and said discharge connection.

8. A relay mechanism including, in combination, means providing a first pressure chamber having a flexible wall, means providing second and third pressure chambers separated by a common flexible wall, means connecting said flexible walls together for simultaneous movement, fluid supply and discharge ports opening into said third chamber, valve means for controlling said fluid supply and discharge ports, means including a member yieldingly urged in one direction for effecting actuation of said valve means to close said supply port and to open said discharge port, said member arranged for actuation by said wall connecting means in the opposite direction for effecting actuation of said valve means to open said supply port and to close said discharge port, adjustable yielding means connected to said wall connecting means, a plurality of additional valve means, a manually rotatable shaft; cams fixed to said shaft for positioning said additional valve means, said cams arranged for positioning the valves in one position of the shaft to connect said first chamber to fluid supply, to connect said second and third chambers in restrictive communication, and to connect said third chamber with said discharge connection; for positioning the valves in a second position of the shaft to connect said first and second chambers to exhaust and to cut off communication between said third chamber and said discharge connection; for positioning the valves in a third position of the shaft to connect said first and second chambers to exhaust and to connect said third chamber to said discharge connection; and for positioning the valves in the fourth position of the shaft to connect said first chamber to fluid supply, to connect said second and third chambers in free communication, and to cut-off communication between said third chamber and said discharge connection.

GEORGE E. LUPPOLD, Jr.
JACK F. SHANNON.

References Cited in the file of this patent

UNITED STATES PATENTS

| Number | Name | Date |
|---|---|---|
| 2,098,914 | Gorrie | Nov. 9, 1937 |
| 2,202,485 | Fitch | May 28, 1940 |
| 2,257,905 | Gorrie | Oct. 7, 1941 |
| 2,441,405 | Fitch | May 11, 1948 |